United States Patent
Belfield et al.

(10) Patent No.: US 10,013,558 B1
(45) Date of Patent: Jul. 3, 2018

(54) METHOD AND COMPUTER READABLE MEDIUM FOR SECURE SOFTWARE INSTALLATION MECHANISM

(71) Applicant: Lockheed Martin Corporation, Bethesda, MD (US)

(72) Inventors: Mark R. Belfield, Syracuse, NY (US); Joseph M Calcagnino, North Syracuse, NY (US); Lawrence J. Derdzinski, Utica, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 188 days.

(21) Appl. No.: 14/972,743

(22) Filed: Dec. 17, 2015

(51) Int. Cl.
| | |
|---|---|
| *G06F 21/00* | (2013.01) |
| *G06F 21/57* | (2013.01) |
| *G06F 21/62* | (2013.01) |
| *H04L 29/06* | (2006.01) |
| *G06F 21/79* | (2013.01) |

(52) U.S. Cl.
CPC ........ *G06F 21/572* (2013.01); *G06F 21/6218* (2013.01); *G06F 21/79* (2013.01); *H04L 63/0435* (2013.01)

(58) Field of Classification Search
CPC .... G06F 21/572; G06F 21/79; G06F 21/6218; H04L 63/0435
See application file for complete search history.

(56) References Cited

U.S. PATENT DOCUMENTS

| | | | |
|---|---|---|---|
| 6,108,420 | A | 8/2000 | Larose et al. |
| 8,271,788 | B2 | 9/2012 | Dancer et al. |
| 8,464,347 | B2 | 6/2013 | Maeda et al. |
| 8,600,892 | B2 | 12/2013 | Maeda et al. |
| 8,856,875 | B2 | 10/2014 | Aditya |
| 8,909,554 | B2 | 12/2014 | Weller |
| 2008/0109396 | A1* | 5/2008 | Kacin ............... G06F 17/30873 |
| 2011/0091041 | A1* | 4/2011 | Zhang ..................... G06F 21/10 380/284 |
| 2013/0318357 | A1* | 11/2013 | Abraham ................ G06F 21/57 713/176 |
| 2015/0172255 | A1* | 6/2015 | Warnez ................. H04W 4/001 713/168 |

* cited by examiner

*Primary Examiner* — Mahfuzur Rahman
(74) *Attorney, Agent, or Firm* — Howard IP Law Group, PC

(57) ABSTRACT

A method for securely updating at least one software application on a target system includes providing a removable computer readable medium containing an installation package that is encrypted using at least one private encryption key, which is resident in an administrator access area of the target system. The removable medium is connected or inserted into the target system. An update mechanism is launched by an operator level user on the target machine. The update mechanism's privileges are elevated to an administrator level by a privilege configuration utility associated with the operating system of the target system. The update mechanism determines if the removable medium contains an expected file and if so, attempts to decrypt the encrypted file on the removable medium using the private encryption key from the target system. If the decryption is successful, the installation package on the removable medium is installed on the target system.

19 Claims, 2 Drawing Sheets

METHOD AND COMPUTER READABLE MEDIUM FOR SECURE SOFTWARE INSTALLATION MECHANISM

STATEMENT OF GOVERNMENT INTEREST

This invention was made with Government support under Contract W15P7T-12-C-C015 awarded by the U.S. Army. The Government has certain rights in this invention.

FIELD OF THE INVENTION

This application relates to secure installation of computer software.

BACKGROUND OF THE INVENTION

When installing or updating software or operating systems on a computer, the computer's operating system may require administrative permissions in order to complete the installation of new software or new files required for patching or updating existing software. Administrative permissions are typically associated with a user account and password and assigned to personnel who have been granted access to secure locations of the computer, including root directories. Root directories store vital operating system files, and other important files used by the computer system. Regular operator level users may be given login credentials which allow the user to perform one or more of read, write, change, or deletion privileges for certain files located on the computer while restricting access to the vital files, such as those stored at the root. The privileges may be specified by an administrator of a computer for a given operator. This may include certain restrictions including the inability to install new software or to install software patches or updates that affect operating system files.

Present solutions to the problem of installing software or operating system installations, updates or patches include requiring a privileged user to be present to perform the installation, automatically elevating system privileges for the installation process for a normal user, temporarily connecting to a network, or disadvantageously, not performing the updates at all.

Requiring an administrator password requires a privileged user to sign in to the system with escalated permissions and perform validation. This does not work in an environment where privileged users having the extensive training necessary for administrative privileges are not often available. In addition, in today's environment of increasing cyber-security awareness, many system owners are seeking to minimize the number of administrative users on these system to reduce exposure.

Automatic elevations of permissions for an unsecured installation mechanism is undesirable for the inherent security vulnerabilities they present. A cyber attack may be performed by anyone with access to the update media by mimicking the installation process to gain unauthorized access to protected resources.

Connecting to a network temporarily requires a network infrastructure that is capable of deploying updates. This solution is not viable in scenarios such as mobile tactical systems, which may be deployed for extended periods of time without access to a managed network, thereby requiring Information Assurance (IA) updates by other means.

Failure to perform updates exposes the system to risk of cyber attack, and does not comply with IA requirements imposed on many remote systems.

Certain operators and in some cases, computer processes that are running on the computer may be granted temporary permissions or privileges that are more permissive than the permission associated with the current user (e.g. normal user) of the computer. In this way, system administrators may push software installation or updates to a computer through an authenticated network. The administrator may perform computer operations while a normal operator level user is logged onto the computer. These operations may include the installation, update or patching of software and operating system files on the computer. This process remains secure because the administrator is identified and authenticated through the monitored network before access to secured areas of the computer is granted.

In the absence of a secured network, stand-alone computers may require software installations, updates or patches. Because these stand-alone stations are not connected to a managed network, the ability to authenticate users attempting to access the system is unavailable. Therefore, software installations or updates must be performed through removable media which may be temporarily mounted by the stand-alone computer. The removable media may contain installation applications and associated computer files which may be installed on the target computer.

To maintain security, installation or updates of software on a stand alone machine requires a user with administrative rights, including permission necessary to install the software or patches, to sign onto the computer and perform the installation or update process. This places the responsibility on the authenticated privileged user for ensuring that the source removable media contains authenticated files from a known and trusted source. In some remote applications, the target machine may be far from an available administrative user, making it impracticable to have persons with sufficient access privileges present to access the target machine for updates or patches. Without applying current updates and patches, the target machine may be vulnerable to exploitation and attack through unauthorized access or malicious software such as viruses or worms.

Some operating systems include mechanisms which allow certain computer processes to temporarily gain administrator privileges and install software or updates to a target machine. For example, UNIX-type operating systems, including LINUX, include the utility SUDO, which allows an administrator to selectively escalate the privileges for certain users or processes to access particular resources that might otherwise be inaccessible. However, allowing users with operator access, or processes that are not tightly managed to elevate their privilege levels to gain administrative access is also insecure, as unauthorized or unintended access to protected resources may occur while privileges are escalated.

Alternative systems and methods are desired which allow for secure installation of software and updates or patches, where no administrative user is available, and which avoid one or more of the security risks described above.

SUMMARY

A method for securely updating at least one software application on a target system includes creating a removable computer readable medium containing an installation package that is encrypted using at least one private encryption key, which is resident in an administrator access area of the target system. The removable medium is connected or inserted into the target system. An update mechanism is launched by an operator level user on the target machine.

The update mechanism provides functionality (e.g. a button or menu) for the operator to click to start the update or install. At launch, the update mechanism has the same privilege level as the operator who launched the update mechanism. Once started, the update mechanism's privileges are elevated to an administrator level by a privilege configuration utility associated with the operating system of the target system. The update mechanism determines if the removable medium contains an expected file and if so, attempts to decrypt the encrypted file on the removable medium using the private encryption key from the target system. If the decryption is successful, the installation package on the removable medium is installed on the target system.

A system for secure installation or updating of at least one software application of a computer includes a target computer system that includes a computer processor in communication with a memory, at least one software application to be installed or updated in the memory of the target computer system, at least one private encryption key stored in the memory at a location of the target computer system which is only accessible to a user having administrator level privileges, and an update mechanism launched by a request of a user having operator level privileges. A removable computer readable medium may be connected or inserted into the target computer system. The removable computer readable medium contains an encrypted file, the encrypted file includes an installation package having computer files configured to install or update at least one software application on the target computer system. The encrypted file is encrypted using the at least one private encryption key stored in the memory of the target computer system. The system of claim also includes an operating system installed on the target system, the operating system associated with a privilege configuration utility. The privilege configuration utility is configured to escalate a privilege level of the update mechanism from the privilege level of the operator level user who launched the update mechanism to an administrator privilege level enabling the update mechanism to use the escalated privilege level to access at least one private encryption key from the memory of the target computer system and decrypt the encrypted file on the removable computer readable medium using the at least one private encryption key.

DETAILED DESCRIPTION

Figure 1:
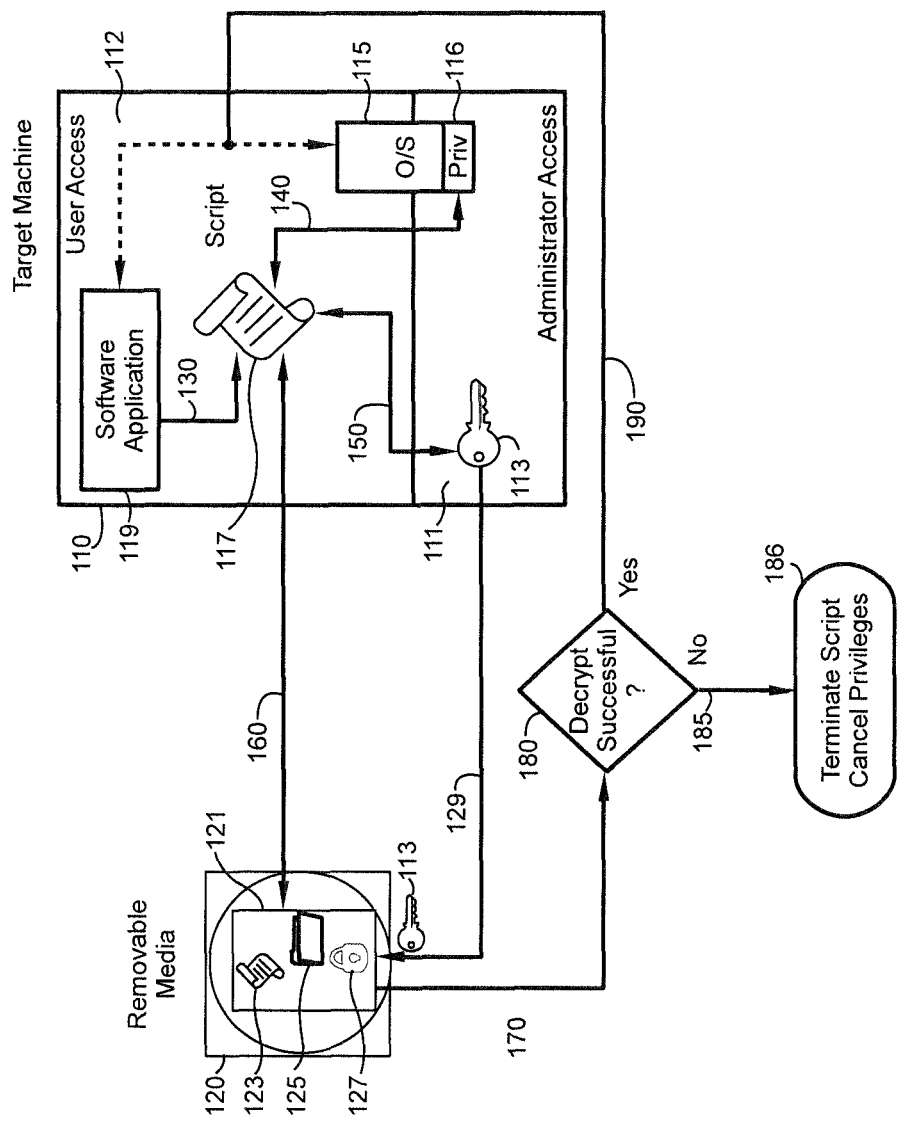
FIG. 1 is a block diagram of a system for secure installation of software or software updates according to an embodiment of this disclosure.

Software and Operating System (OS) installations, patches and updates require administrative permissions. In many mobile or remote tactical environments, privileged users are not readily available. Automatic elevation of privileges is possible, but inherently insecure and highly vulnerable to cyber attacks. Additionally, since mobile or remote systems are not typically on a managed network, there is not a way to authenticate the installation.

Currently installation of operating system updates and software in a LINUX system when the files involved are owned by a privileged user requires the installer to enter in the root password. This is undesirable in situations where information assurance updates are needed on a fairly regular basis to combat the ever-changing cyber vulnerabilities found in operating systems and other third party software packages. In many cases updates can be applied monthly, weekly, or even more frequently. This would require a privileged operator to install these updates in order to be readily available. In mobile military tactical units, the system operators are typically not trained for system administrative privileges and therefore cannot install these patches on their own.

Alternatively, the system administrator can configure the operating system to automatically elevate the privilege of certain processes within the operating system. In this case, the installation mechanism can be elevated automatically, thereby allowing the patches to be installed. However, this exposes a significant security risk in that an attacker can easily mimic the installation mechanism and with no knowledge of the system, execute catastrophic damage or even steal secret information.

Additionally, on a managed network a system administrator can "push" authenticated updates to users across the network, thereby reducing the risk of corruption or attack. Mobile tactical systems are often not connected to managed networks and do not have the benefit of remote authentication and updates.

This disclosure presents a secure method of installing system updates (operating system patches, software updates, etc.) so that a non-privileged system operator can perform the updates without exposing a security risk.

The method involves using a private encryption key, such as a secure shell (SSH) key, by way of non-limiting example, or other private encryption key, to encrypt the installation media contents. The key is installed onto the target system ahead of time. According to one embodiment, an entry is made in a permission elevation mechanism. For example, a permission elevation mechanism in one embodiment of the invention may be the inclusion of an entry in the SUDOERS file of a LINUX operating system. The permission elevation mechanism allows the installation mechanism of application to execute at an elevated permission level.

When the installation media is installed into the machine to be updated, the operator (with "user only" permissions) launches the installation mechanism from the machine to be updated. The installation mechanism then uses the private encryption key to decrypt the file from the installation media. The installation mechanism then places the decrypted file onto the installation machine. Another file is launched (e.g. script or application) that is configured in the permission elevation mechanism so that it runs at the elevated permission. This process will execute the install mechanism that is embedded in the decrypted package and perform the update with the elevated permissions. The operator does not need to know the password to decrypt the file as the hard drive stores the key that was used to create the media in a logical location that is only accessible to administrative users.

The system and method embodied in the present disclosure protects the script or application that executes with elevated permission by embedding it in a file encrypted with a private encryption key. An operator without special permissions (e.g. administrative privileges) can execute operating system patches as well as software updates to keep up with the information assurance compliance requirements. No additional training is needed for the operator, no password entry needed and no person with special permissions is required. The security mechanism is secure and not easily compromised.

The method according to the disclosure provides a secure method for installing updates to systems on an unmanaged network so that a non-privileged operator can perform the updates without exposing a security risk.

On a target machine, the method includes the creation of a private key. A script or application is created on a target machine that will use the private key to decrypt the installation package. The script or application includes authentication logic for performing an authentication process. The operating system is configured to operate the installation mechanism or application as a privileged user.

Installation media containing the update files is created including a script or application that will install the updates, as well as the update computer files. The contents of the installation media are encrypted using the preconfigured private key that is stored on the target machine. Because the encrypted installation package was created with the preconfigured private key that is resident on the target machine, this ensures that only authenticated media can be executed on the target machine with elevated permissions.

The systems and methods described herein allow systems on unmanaged networks to be securely updated without requiring a privileged account. Offline systems may be updated with the same level of security as systems connected to a managed network. The need for an available system administrator to perform system updates is eliminated. The system is protected from unauthorized updates.

Referring now to FIG. 1, a block diagram of a system for secure installation of software or software updates is shown. A target machine 110 includes software application 119 installed on target machine 110 and an operating system 115 installed and running on the target machine 110. At times, software application 119 and the operating system 115 installed on the target machine 110 may need updating. Updating typically involves the installation of new computer files onto target machine 110. The computer files may delete, modify or replace existing files, or may be new files which supplement the software already installed. It is also possible that a user to target machine 110 may want to install a new software application that was not previously installed on target machine 110.

Target machine 110 includes a file system which determines where and how data is stored on the target machine 110. Some files within the file system are vital to the operation and security of the target machine and are designated by the operating system 115 as requiring administrator access 111 (e.g. administrator privileges) to access them. Other files in the file system of target machine 110 may be accessible to users having normal operator privileges (e.g., non-administrative, without special access), such as data directories associated with a user account for creating data files and storing them for later retrieval. Some files may allow an operator to read the file, but not modify or delete the file. The operating system 115 may provide operator level privileges to files that allow user access 112. The operating system 115 itself requires both administrator access 111 and user access 112. That is, in order to operate the target machine properly, the operating system 115 must have access to the entire file system of target machine 110. Therefore, the operating system 115 has access to files in both the administrator access 111 and user access 112 regions (e.g. logically organized areas of the file system which have restricted or limited access).

Operating system 115 further includes a privilege configuration utility 116 that allows the operating system 115 to modify privilege levels for specific users or computer processes. The privilege configuration utility 116 may be accessed by an administrator and instructed to provide temporary increased privilege levels for selected users or selected processes with respect to specified resources on target machine 110. For example, in a LINUX operating system, the SUDO utility, which resides on the root level accessible only to users with administrative privileges, performs the functions of a privilege configuration utility 116.

The software applications 119 and operating system 115 installed on target machine 110 may need installation, updating, or patching. An installation package may be stored on a removable medium 120, which may be inserted or connected to an input port of target machine 110. For example, removable medium 120 may be an optical read only disk, such as a compact disk (CD) or digital versatile disk (DVD) which may be inserted into a compatible disk drive in target machine 110. Alternatively, removable medium 120 may comprise a memory stick, memory card, portable hard disk drive (HDD), thumb or flash drive, and the like which is connectable to target machine 110 through an input/output port via a communication connection such as a Universal Serial Bus (USB) port (not shown).

Removable medium 120 contains an encrypted file 121 containing information and resources for the installation, update, and/or patching of a software application or operating system 115 on target machine 110. The contents of encrypted file 121 are protected from unauthorized access by virtue of their encryption 127 using one or more private keys 113. Encrypted file 121 also includes computer files 125 which contain the updated software or operating system files which are intended to be placed onto target machine 110. An installation mechanism 123 is included in encrypted file 121 which provides instruction steps which may be executed by a processor of target machine 110 for properly installing computer files 125 on target machine 110.

Encrypted file 121 is encrypted using one or more private keys 113 which are resident on target machine 110. Private keys 113 reside on target machine 110 at a logical location or region having administrator access 111. Accordingly, an operator-level user of target machine 110, who only has user access 112 cannot access private keys 113 used to encrypt the encrypted file 121 on removable medium 120.

The procedure for updating or installing software or operating system 115 of target machine 110 will now be described with reference to FIG. 1. Target machine 110 includes one or more installed software applications 119 and operating system 115, either of which may periodically require update or patching. An operator level user receives a removable medium 120 from a known and trusted source. The removable medium 120 contains an encrypted file 121 which contains installation mechanism 123 and computer files 125 needed for updating or patching the software applications 119 and/or operating system 115 of target machine 110. The user inserts or connects the removable medium 120 to target machine 110 using an available communication port as indicated by arrow 160. The user then accesses a software application 119 to initiate the update process. Software application 119 may be the software which is being updated by the update process, or software application 119 may be a helper application or utility for facilitating the start of an authentication and update process.

Software application 119 is configured to launch a computer process 130 which runs an update mechanism 117 resident on target machine 110. Update mechanism 117 operates within a computer process 130. Operating system 115 includes a privilege configuration utility 116 within the administrator access 111 region of target machine 110 and allows an administrative level user to delegate authority or privileges to a select user or group of users, allowing the selected user(s) to operate some or all commands while being granted administrative privileges. An example of such a utility is SUDO, a utility available for UNIX-type systems. Referring again to FIG. 1, computer process 130 is identified and authenticated 140 by the privilege configuration utility 116. Once authenticated, computer process 130 proceeds to execute commands included in update mechanism 117. The update mechanism 117 uses the granted administrator privileges to access the private encryption keys 113 in the administrative access 111 region of target machine 110 as shown by arrow 150 in FIG. 1. The update mechanism 117 then accesses the encrypted file 121 from the removable media 120, which was inserted or connected 160 to the target machine 110. The encrypted file 121 of the removable medium 120 was encrypted at the time of its creation by a known and trusted source using the private keys 113 that are resident in the administrator access 111 region of target machine 110 as indicated by arrow 129. The known and trusted source verifies and authenticates the installation mechanism 123 and computer files 125 associated with the software installation files. The validated or authenticated installation files are secured using the private encryption keys 113 to prevent unauthorized access to these files after they are encrypted and placed on the removable medium 120.

Update mechanism 117 executes commands to access the encrypted file 121 by filename. That is, update mechanism 117 contains commands which are specifically configured to look for a file having an expected filename provided by the known and trusted source that created the encrypted file 121 on removable medium 120. If the expected file is found, the update mechanism 117 uses the private keys 113 that it retrieved from the administrative access 111 area of target machine 110 and attempts to decrypt 170 the encrypted file 121 on removable medium 120.

The update mechanism 117 attempts to decrypt the encrypted file 121 by issuing a decrypt command specifying the private encryption key 113 to use in decrypting the file. If the decrypt command fails to decrypt the encrypted file 121, the decrypt command will issue an error status which is monitored by the update mechanism 117, Otherwise, the decrypt command ends with a normal or successful status. If the file decrypts successfully, the update mechanism further verifies the name of the files that are created from the decryption as a final verification that the decryption was successful. If the attempt by update mechanism 117 to decrypt 170 the encrypted file 121 is successful 180, then it is certain, by virtue of the decryption through use of private keys 113 that the installation package files are verified by a known and trusted source. Since the update mechanism may only access the private key using granted administrator level privileges, and the same private key must be available and used by the source of the removable medium for encryption, it is assured that the removable medium originated from a trusted source and is validated for installation on the target machine 110. Likewise, it is confirmed that the computer process running the update mechanism is the expected process which has been given permission by a system administrator to install the update once the installation package has been authenticated. Once the installation package is validated, the decrypted installation mechanism 123 and installation computer files 125 are installed 190 on target machine 110 by update mechanism 117 using its elevated administrator level privileges. The installation files may be a new software application being installed on target machine 110, or the installation files may be updates or patches to existing software applications 119 or the operating system 115 of target machine 110. The installation mechanism 123 and computer files 125 are installed on the target machine 110 using the administrative level privileges provided to update mechanism 117 by the privilege configuration utility 116. If the decryption is not successful 185, for example, the decrypt command outputs an error status, then the update mechanism 117 is stopped and the privileges granted by the privilege configuration utility 116 are canceled or released 186, thereby securing access to the target machine 110.

The system of FIG. 1 allows a user with operator level privilege to access a software application 119 which launches update mechanism 117. In some embodiments, update mechanism 117 may be launched in response to the insertion or connection of the removable medium 120 to the target machine 110. The update mechanism's 117 privileges are elevated or escalated from that of the user who launched the update mechanism 117 to administrative privileges through the privilege configuration utility 116. Privilege configuration utility is pre-configured by an administrator to grant elevated privileges to the computer process 130 that is running update mechanism 117. Having administrator privileges allows the update mechanism 117 to access the private encryption keys 113 resident on the target machine, which would otherwise be inaccessible to the user performing the update. The private keys 113 are used to authenticate and validate the encrypted contents of an installation package stored on a removable medium 120. When the removable medium is connected to the target machine, the update mechanism 117 attempts to decrypt the contents using the private keys 113 of the target machine, which were also used to encrypt the contents of the removable medium 120. Successful decryption means the installation files are authenticated and validated and the update mechanism 117 uses its elevated privilege privileges to run the installation program or installation mechanism 123 to install the new installation computer files 125 on the target machinem 110. In the foregoing manner, a user without administrator level privileges may install computer software or perform updates or patches to software including the operating system without the need for a system administrator to be present while maintaining the security and information assurance requirements established for the target machine.

Figure 2:
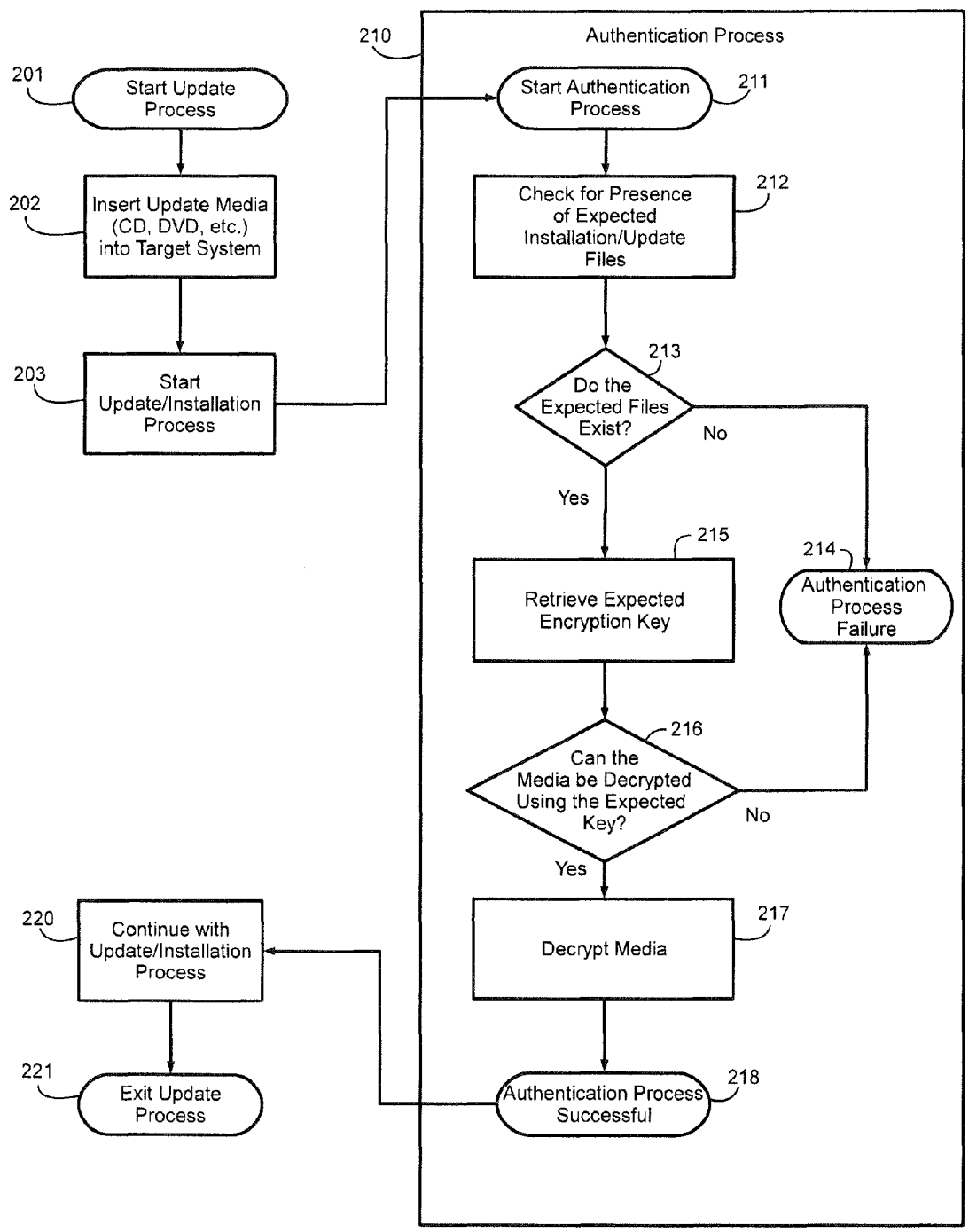
FIG. 2 is a flow diagram of an authentication procedure for secure installation of software or software updates according to an embodiment of this disclosure.

FIG. 2 is a process flow diagram of an authentication procedure for secure installation of software or software updates. The process begins with the start of an update process 201. The update process may relate to a target system. The target system may be a computer having a processor in communication with computer memory that includes software applications and an operating system installed on the target system. The software applications and operating system may require periodic updates or patches to maintain the security of the target system.

An encrypted file containing one or more files or programs, which constitute a software installation package for providing software updates or patches is encrypted using private keys. The private keys are resident in an area of the target system that is only accessible to administrative users of the target system. The removable medium may take various forms, such as a CD, a DVD, a portable HDD, thumb or flash drive or memory stick. The removable medium is inserted or connected into the target system 202.

The target system may not be connected to managed network. Therefore, installation of software, or installation of updates or patches which require administrator access may need to be installed at locations were system administrators are not available. According to the authentication process of FIG. 2, an operator-level user starts an update/installation process 203. The operator-level user may start the update/installation process by selecting an update or installation option provided by a software application on the target system that the operator-level user is permitted to run. Selection of the update/installation option begins the authentication process 210. The authentication process begins 211 by launching an update mechanism. The update mechanism automatically performs a list of computer commands at the target system. The operating system of the target system includes a privilege configuration utility which allows an administrator of the target system to pre-configure privilege levels for selected users or groups of users and allows the selected users to operate on the target system with elevated privileges such as those reserved for administrative users. The computer process running the update mechanism is identified by the privilege configuration utility, which elevates the privilege level of the running update mechanism from the user level privilege of the user performing the update to administrator level privileges. Once the script's privileges have been elevated, the script checks the removable medium containing the encrypted installation package for an expected filename 212. If the expected files exist 213, the script retrieves the private encryption keys residing on the target system 215 in an area accessible only to administrative level users. If the expected files do not exist then the authentication process fails 214 and the script is stopped and its elevated privileges are canceled.

If the expected files exist and the script has retrieved the private keys from the target system, the script attempts to decrypt the installation package files using the private key. Because the installation package was encrypted by a known and trusted source of the installation files, using the private keys from the target system, successful decryption of these files authenticates the installation package files as to their source and their validity. The script determines if the encrypted file on the removable medium can be decrypted using the private keys 216. If the encrypted file can be decrypted using the private encryption keys, the media is decrypted 217 and the authentication of the installation package files is complete 218. If the files cannot be decrypted using the private encryption keys, then the authentication process fails 214 and the script is stopped and its elevated privileges are canceled.

If the authentication process 210 is successful 218, the installation package is launched by the update mechanism using its elevated privileges. Because the script's elevated privileges allows the script to access the target system as an administrative user, the software installation process proceeds 220. Once the software is installed, or alternatively, updated or patched, the installation procedure ends 221 and the script comes to an end and stops, releasing the elevated privileges granted to the script and restoring the security of the target system.

The method depicted in FIG. 2 allows a user having only operator level privileges to install software, and update or patch software and operating systems on target systems without the need for a managed network or the presence of a trained system administrator to log into the target system to install software changes. The software of the target system may nevertheless be update to maintain security of the target system and to meet the information assurance requirements established for the target system.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A method for securely updating at least one software application on a target system, the method comprising the steps of:

providing a computer readable medium removably connectable to the target system and containing an installation package that is encrypted using at least one private encryption key, the at least one private encryption key being resident on the target system and accessible only to a user of the target system having administrator level privileges;

connecting the removable computer readable medium to target system;

with a processor of the target system, launching an update mechanism computer process at the request of a user having operator level privileges, the update mechanism configured to perform computer commands to update the at least one software application;

elevating a privilege level of the update mechanism computer process from operator level privileges to administrator level privileges by a privilege configuration utility associated with an operating system of the target system;

accessing by the update mechanism computer process, the at least one private encryption key resident on the target system;

accessing by the update mechanism computer process, the removable computer readable medium and determining if an predetermined expected file exists on the removable computer readable medium;

on a condition that the predetermined expected file exists, attempting, by the update mechanism computer process, to decrypt the expected file using the at least one private encryption key accessed from the target machine;

wherein on a condition that the expected file is successfully decrypted using the at least one private encryption key, launching by the update mechanism having elevated administrator level privileges, the decrypted installation package from the removable computer readable medium to install a software application update to the target system.

2. The method of claim 1, wherein the at least one software application to be securely updated comprises an operating system of the target system.

3. The method of claim 1, wherein the request to launch the update mechanism is initiated from the at least one software application to be updated.

4. The method of claim 1, wherein the installation package on the removable computer readable medium contains a single encrypted file, the single encrypted file comprising an installation mechanism and at least one updated computer file for the at least one software application to be updated.

5. The method of claim 1, wherein the operating system of the target system is a LINUX operating system.

6. The method of claim 5, wherein the privilege configuration utility is SUDO.

7. The method of claim 1, further comprising the steps of:
defining by an administrator of the target system, elevated privileges for the update mechanism computer process via the privilege configuration utility.

8. The method of claim 1, wherein the removable computer readable medium containing an installation package includes files verified and provided by a known and trusted source, the known and trusted source having access to the at least one private encryption key resident on the target system.

9. The method of claim 1, wherein the removable computer readable medium comprises an optical read only disk, and wherein connecting the removable computer readable medium to the target system comprises inserting the optical read only disk into a disk drive of the target system.

10. The method of claim 1, wherein the removable computer readable medium comprises a Universal Serial Bus (USB) flash drive, and wherein connecting the removable computer readable medium to the target system comprises connecting the USB flash drive to a compatible USB port on the target system.

11. A non-transitory computer readable medium for performing a secure software installation on a target system, the computer readable medium being removably connectable to the target system and storing computer instructions that when executed by a computer processor of the target system, cause the computer processor to perform the steps of:

accessing an update mechanism computer process at the request of a user having operator level privileges, the update mechanism configured to perform computer commands to update the at least one software application;

accessing a privilege configuration utility of an operating system installed on the target system, the privilege configuration utility configured to escalate a privilege level of the update mechanism from the privilege level of the operator level user who accessed the update mechanism to an administrator privilege level;

accessing an installation package containing computer files for the installation or update of at least one software application on the target system from a known and trusted source;

accessing at least one private encryption key, the at least one private encryption key being resident on a storage memory of the target system at a storage memory location that is accessible only to an administrator level user of the target system;

encrypting the computer files of the installation package into a single encrypted computer file; and storing the single encrypted computer file on the computer readable medium, wherein the update mechanism is configured to use the escalated privilege level to access the at least one private encryption key from the memory of the target computer system and decrypt the encrypted file on the removable computer readable medium using the at least one private encryption key.

12. The non-transitory computer readable medium of claim 11, wherein the installation package comprises an installation mechanism and at least one computer file, the at least one computer file being an updated file associated with the at least one software application on the target system.

13. The non-transitory computer readable medium of claim 11, wherein the installation package contains computer files for updating an operating system of the target system.

14. The non-transitory computer readable medium of claim 11, wherein storing the single encrypted computer file on the computer readable medium comprises copying the encrypted single computer file to an optical read only disk.

15. The non-transitory computer readable medium of claim 11, wherein storing the single encrypted computer file on the computer readable medium comprises copying the encrypted single computer file to a Universal Serial Bus flash drive.

16. A system for secure installation or updating of at least one software application of a computer comprising:
a target computer system comprising:
a computer processor in communication with a memory;
at least one software application to be installed or updated in the memory of the target computer system;
at least one private encryption key stored in the memory at a location of the target computer system which is only accessible to a user having administrator level privileges;
an update mechanism, wherein the update mechanism is launched by a request of a user having operator level privileges; and
an operating system installed on the target system, the operating system comprising a privilege configuration utility, the privilege configuration utility configured to escalate a privilege level of the update mechanism from the privilege level of the operator level user who launched the update mechanism to an administrator privilege level; and
a removable computer readable medium for removably connecting to the target computer system, the removable computer readable medium containing an encrypted file, the encrypted file containing an installation package including computer files configured to, when executed by the computer processor of the target computer system, install or update the at least one software application on the target computer system, the encrypted file being encrypted by the at least one private encryption key stored in the memory of the target computer system, wherein the update mechanism is configured to use the escalated privilege level to access the at least one private encryption key from the memory of the target computer system and decrypt the encrypted file on the removable computer readable medium using the at least one private encryption key.

17. The system of claim 16, wherein the operating system is a UNIX-type operating system and the privilege configuration utility is SUDO.

18. The system of claim 16, wherein the removable computer readable medium comprises an optical read only disk.

19. The system of claim 16, wherein the removable computer readable medium comprises a Universal Serial Bus flash drive.

* * * * *